United States Patent [19]

Stolzer

[11] 3,847,048
[45] Nov. 12, 1974

[54] POWER FRAME SAW
[75] Inventor: Paul Stolzer, Achern, Germany
[73] Assignee: Keuro Maschinenbau Gesellschaft mit beschhrankter Haftung & Co., KG, Achern, Germany
[22] Filed: Nov. 8, 1973
[21] Appl. No.: 414,127

[30] Foreign Application Priority Data
Dec. 22, 1972 Germany............................ 2262957

[52] U.S. Cl. .................................................. 83/452
[51] Int. Cl. ......................... B23d 49/04, B26d 7/02
[58] Field of Search ............ 83/452, 564, 628, 647, 83/647.5

[56] References Cited
UNITED STATES PATENTS
2,175,499  10/1939  Wodack et al...................... 30/371
3,170,496  2/1965   Kohler et al...................... 83/628 X
3,492,902  2/1970   Stolzer............................. 83/647 X FOREIGN PATENTS OR APPLICATIONS
843,946  7/1952  Germany

960,503  3/1957  Germany
795,296  5/1958  Great Britain

Primary Examiner—Willie G. Abercrombie
Attorney, Agent, or Firm—Spencer & Kaye

[57] ABSTRACT

A power frame saw including a bench frame on which a workpiece to be cut is mounted between a set of adjustable clamping braces. A saw frame which holds a saw blade is positioned within a housing and is displaceably mounted therein so as to be capable of being moved in a reciprocating stroke direction. The housing, in turn, is pivotably articulated to a machine frame arranged on the bench frame. A drive system is mounted within the housing and includes a crank disc, which is operatively coupled to the back portion of the saw frame. This back portion of the saw frame extends in the direction of reciprocating stroke movement of the saw frame and is provided with two widened portions which form web sections, both of which extend transverse to the longitudinal axis of the back portion. An arrangement is provided for displaceably guiding the web sections within the housing so as to be moved along the reciprocating stroke direction.

10 Claims, 7 Drawing Figures

POWER FRAME SAW

BACKGROUND OF THE INVENTION

The present invention relates to a power frame saw in which a workpiece is held during the cutting operation on a bench plate between a set of adjustable clamping jaws.

The saw frame which holds the saw blade in such an arrangement is mounted within a housing which is pivotably articulated to a machine frame, which in turn is connected to the bench frame of the power frame saw. The drive system of the arrangement is arranged within the housing and includes a motor-driven crank drive which is coupled to the saw frame.

In known power frame saws of this kind, the saw frame is generally mounted in a freely overhung manner on the forward end of a mounting plate which is parallel with the cutting plane of the saw blade. This mounting plate is guided in the pivotable housing and has a slot extending perpendicular to the direction of the stroke movement of the saw frame. The crank drive includes a crank disc with an associated crank pin. This crank pin is arranged within the slot in the mounting plate, possibly with interposition of an anti-friction bearing, for the generation of the reciprocating stroke movement of the saw frame. This type of construction, however, requires relatively large dimensioning of the power frame saw in the direction of the stroke movement. Since the housing must be able to permit the guidance of the mounting plate over the length of the saw frame stroke outside the working range of the saw frame, the machine increases by more than the length of the saw frame stroke than would per se be necessary in this direction for the saw frame including its stroke range.

The same drawback occurs to an even greater extent in those known power frame saws in which the crank disc is rotatable about an axis coaxial with the pivotal mounting axis of the housing and acts on the saw frame by means of a crank rod.

In previously known machines, it has also been common to either generate the cutting force with which the saw blade penetrates into the workpiece by the possibly adjustable weight of the pivotably articulated saw parts or make use of a usually hydraulic feed device for this purpose which moves the saw blade with adjustable pressure towards the workpiece, in which case the arrangement can be made such that the saw blade is lifted away from the workpiece during the idle stroke to reduce wear.

Finally in power frame saws in which cutting takes place during movement in the pushing direction, it is known to clamp in the saw blade so as to be obliquely orientated with respect to the saw frame guide, in such a way that a feed motion in the direction towards the workpiece takes place during the working stroke due to the oblique position.

SUMMARY OF THE INVENTION

An object of the present invention is to provide a power frame saw which avoids the above-mentioned drawback.

More specifically, the objective of the present invention is to improve the known power frame saws so that their construction length, considered in the stroke direction, is practically limited to the length of the saw frame plus the length of its stroke. In accordance with the present invention this objective is to be achieved without detriment to the robustness and working capacity achieved in previously known power frame saws.

It is furthermore an objective of the present invention to provide such an improvement without any increase in construction expense and accordingly without any increase to the ordinary purchase costs for the power frame saw.

Furthermore, in accordance with the present invention, it is possible to produce a small space-saving amateur craftsman's appliance which can be operated by the type of drive mechanism usually provided for such appliances, mostly in the form of a hand-held power drill, and can be produced inexpensively.

The invention is here based on recognition of the fact that in power frame saws it is necessary to have some space extending transversely of the working plane of the saw blade, so that the material to be cut, usually in rod form, can be fed and clamped in, and that power frame saws are not included among the machines which should even only approximately reach the ordinary height of rooms and consequently this later design limitation need not be taken into consideration.

These objectives are achieved in accordance with the present invention in that: the back portion of the saw frame is widened in two areas both in a web form extending transverse to the direction of the reciprocating stroke movement of the saw frame; these web sections are displaceably guided within the housing; and the crank drive includes a crank disc which is rotatably mounted in the housing above the back portion of the saw frame and lies substantially within the region of the saw frame stroke movement about a rotational axis which is parallel with the working plane of the saw blade and perpendicular to the direction of the stroke movement.

By constructing the power frame saw in this manner, the length of the power frame saw, including the machine frame in the stroke direction, is limited to the length of the saw frame plus its stroke. It is possible to so limit the length of the structure since the saw frame drive is arranged above the saw frame where sufficient space is always available and since the saw frame guide, in relation to the working plane of the saw blade, lies beside the saw frame where likewise sufficient space must always be present in order to provide sufficient space for the material to be cut which is ordinarily in rod form.

Due to the tension of the saw blade, which cannot always be set to either the same or a precise value, correspondingly different curvatures of the back portion of the saw frame occur. It, therefore, is expedient, in accordance with the present invention, that the ends of the webs be pivotable about an axis perpendicular to the working plane of the saw blade and to the stroke direction, so that their position in or on the guides of the housing becomes independent of the curvature of the back portion of the saw frame. The web ends for this purpose can have bores in which corresponding cylindrical journals are arranged.

It has proven advantageous in the driving of the saw frame that the axis of the crank disc lies in the working plane of the saw blade and that the crank disc engages via a crank pin with a groove formed in the top of one of the webs and extending in the longitudinal direction of the web. If the drive is to be independent of different curvatures of the saw blade back, the ends of the webs can be interconnected by a bridge member, which is parallel with the webs, and the crank disc can engage with a crank pin in a groove formed in the top of the bridge member and extending in the longitudinal direction of the bridge member.

The two webs which have been described above can fundamentally be positioned at any desired points along the longitudinal extent of the back portion of the saw frame, depending on whether preference is to be given to especially good guidance of the saw frame or to the shortest possible formation of the guideways in the housing. If the webs are placed relatively close together, this produces a length of the guideways which corresponds to the interval of the webs plus the saw frame stroke. If however the webs are placed at the two ends of the saw frame back, one obtains saw frame guidance which is optimum, at least in as much as the frame itself does not need to be especially stoutly dimensioned to take account of freely overhanging parts. In this later situation it can then be expedient to replace the above-described bridge connecting the ends of a web by the provision of a third web section arranged in the center of the back portion of the saw frame for providing a groove for receiving the crank pin. This third web then lies in the neutral cross section of the back portion of the saw frame since the flexure of the saw frame has no effect upon the pivotal position of the groove.

It is further possible to provide anti-friction bearings for the reduction of friction between the crank pin and the groove on the one hand and between the web ends and the housing guides on the other.

It can also be expedient, however, for the crank disc to act on the saw frame through a crank rod pivotally articulated to the disc and to the back portion of the saw frame, whereby there are no limits as regards the arrangement of the crank drive within the range of movement of the saw frame, which is intended according to the present invention.

It has proven advantageous in the arrangement according to the present invention for the saw frame guides to be mutually parallel rods carried by the housing, on which rods the web ends are mounted so as to be displaceable in the stroke direction. For such mounting purposes, bores are provided in the ends of the webs; these bores correspond to the cross section of the rods and are aligned with the rods.

Especially with a view towards providing a simple and space-saving frame saw such as an amateur craftsman's appliance, it is desirable for the housing to have an opening surrounded by clamping jaws with the axis of the opening being parallel to the axis of the crank disc, in this manner the drive output end of an amateur craftsman's machine can be inserted into the opening and secured by the clamping jaws by use of a clamping screw. The threaded shank of a drive pinion can be screwed into the threading of the machine serving to receive the tool and the drive pinion then meshes with a toothing provided on the periphery of the crank disc. For these purposes, it is possible to utilize, for example, a portable power drill as the portable motor to be so inserted.

Finally, in a known manner, the saw blade can be clamped in obliquely of the saw frame guidance in such a way that a feed motion of the saw blade in the direction towards the workpiece takes place during the cutting stroke. Thus, here again the possibility is provided of the saw blade carrying out an arcuate cut, which as is known has a favorable effect with regard to the cutting performance and to the cutting of material having thin-walled cross sections or of brittle or splintering materials.

Furthermore, in accordance with the present invention, it is also preferable for the clamping jaw nearer to the pivot mounting of the housing to be firmly connected with the machine frame and that the cutting movement of the saw blade be directed towards this clamping jaw, i.e., the machine works with what is called a pulling cut. With such an arrangement, especially for the sawing of miter cuts where a cutting force component extends in the longitudinal direction of the workpiece, that is transversely of the clamping jaws, action is taken against the possibility of the workpiece being pushed out of the clamping device. If there was a tendency to push the workpiece out of the clamping device, this would load the saw blade transversely of the direction of stroke, which as is known causes a considerable danger of fracture.

Of course the power frame saw according to the invention as described can work not only with the generation of the cutting pressure by the action of the inherent weight of the pivotably articulated saw parts or by manual application of force, but also with automatic, preferably hydraulic, possibly adjustable, saw blade feed motion and cutting force generation.

BRIEF DESCRIPTION OF THE DRAWINGS

FIG. 3b is a partial sectional lateral elevational view of the saw frame shown in FIG. 3a.

FIG. 3c is a cross-sectional view of the saw frame shown in FIG. 3a.

DESCRIPTION OF THE PREFERRED EMBODIMENTS

Figure 1:
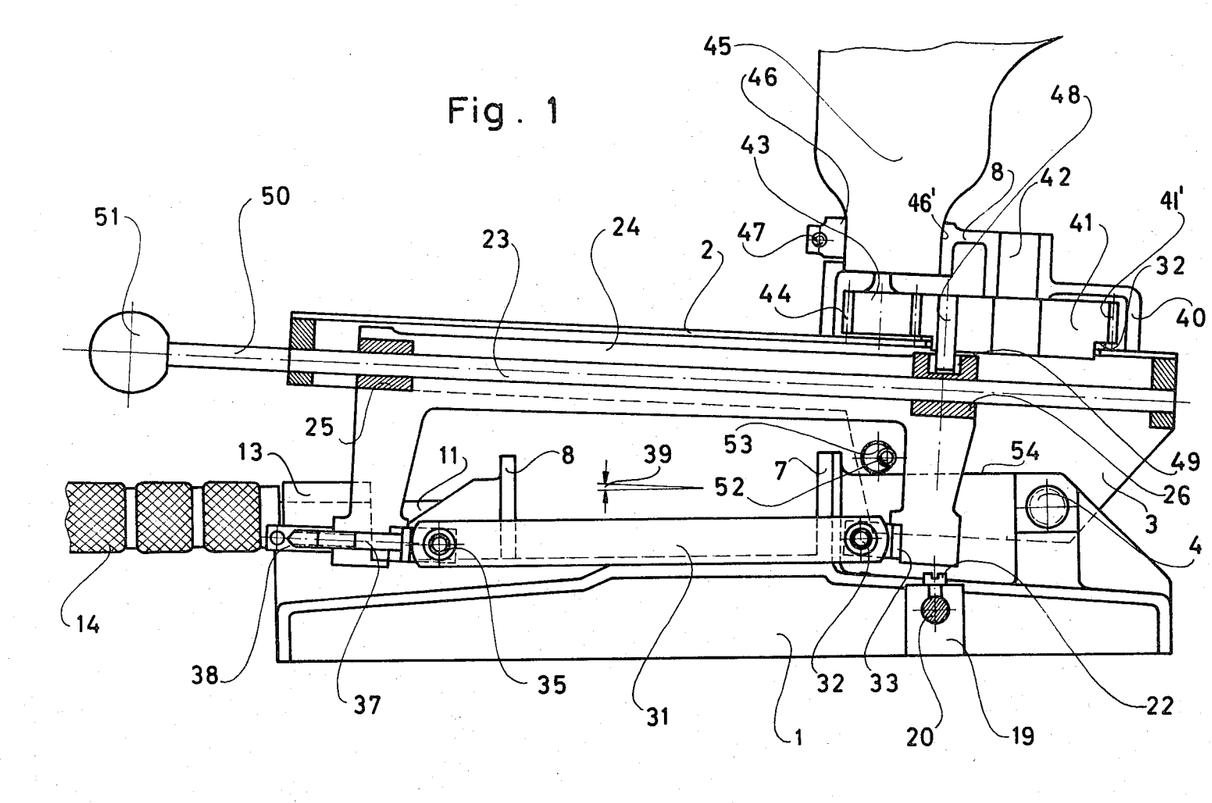
FIG. 1 shows a partially sectional lateral elevational view of an embodiment of a power frame saw in accordance with the present invention, for use as an amateur craftsman's machine.
Figure 2:
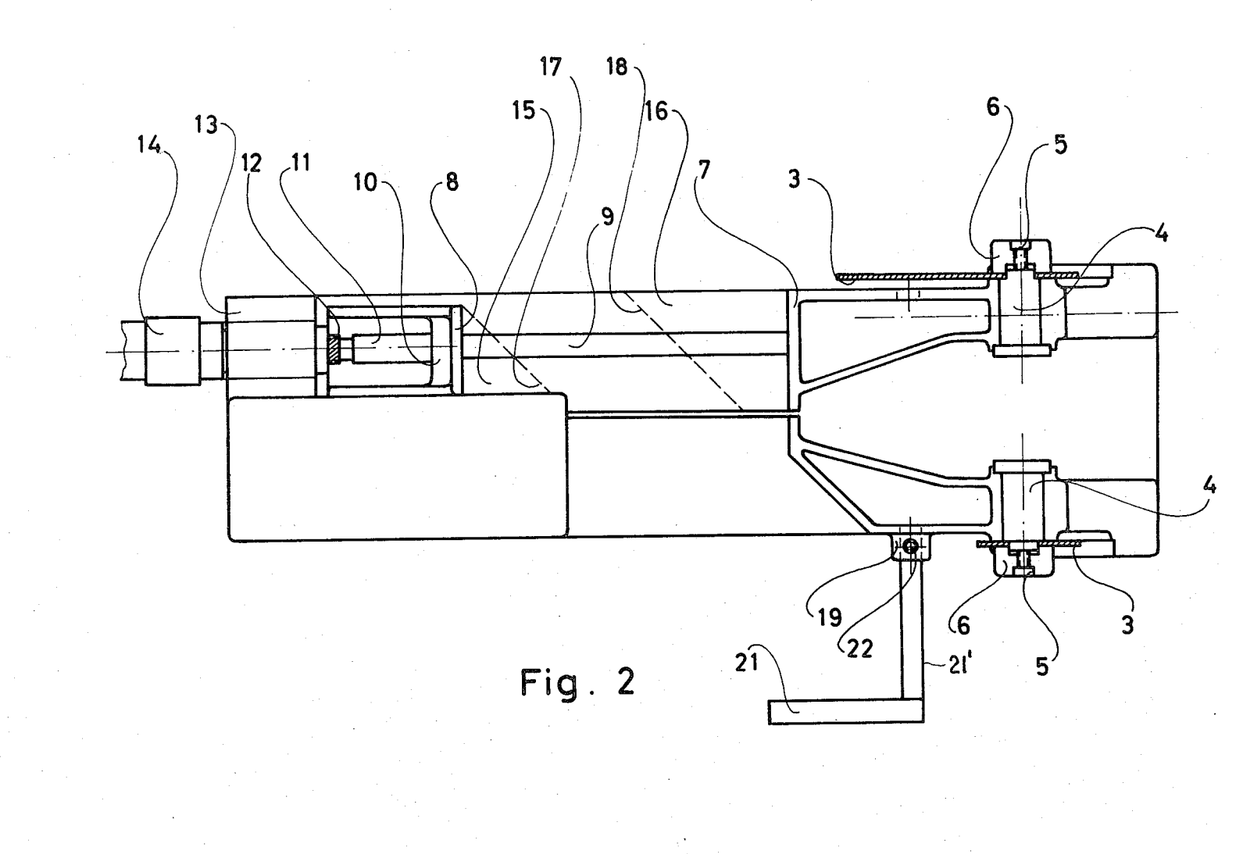
FIG. 2 shows a plan view of the machine frame of the power frame saw of FIG. 1.

As shown in FIGS. 1 and 2, the power frame saw consists of a machine frame 1, on the one end of which a housing 2 is rotatably mounted by means of side members 3 formed thereon and pivot journals 4. As shown in FIG. 2, the securing of the side members 3 is here effected in that they are braced against the pivot journals 4 by screws 5 through clamping heads 6.

The machine frame 1, which is in the form of a plate and can be an aluminum casting, has a fixed clamping jaw, or brace, and a movable clamping jaw, or brace, 8. Clamping jaw 8 slides in a groove 9 and its displacement is effected by rotation of a spindle 11 which is rotatably mounted on the clamping jaw 8 at position 10 but is secured in the axial direction. Spindle 11 is rotatable with a threading 12 in a bracket 13 formed on the machine frame, by means of a handle 14. Blocks 15 and 16 illustrated as dashed lines can be inserted between the clamping jaws 7 and 8. These blocks 15 and 16 engage with webs arranged on their underside in the groove 9. The blocks 15 and 16 have clamping faces 17 and 18 extending obliquely to the longitudinal axis of the machine frame but parallel to one another and serve as an auxiliary tool if cutting angles differing from 90° are necessary on a workpiece.

The machine frame 1 also has a clamp 19 positioned around a bore 20 into which a bar 21 can be pushed which carries a stop 21' for the workpiece on its end lying forward in FIG. 1 and downward in FIG. 2. The axial position of the bar can be secured by a clamping screw 22.

The housing 2 has two mutually parallel guide rods 23 on which the back portion 24 of a saw frame is displaceably mounted. For this purpose (see also FIGS. 3a-3c) the back portion of the saw frame has on its two ends, web sections 25 and 26 extending transversely with respect to the stroke direction. In these web sections, there are arranged aligned bores 27 and 28 for receiving the guide rods 23.

A saw blade 31 is held under stress between the free ends of the legs 29 and 30 of the saw frame. One end of the blade 31 is pivotally articulated at 32 to a bolt 33 which is firmly seated in the bore 34 of the leg 30 while the other end of the blade is pivotably articulated at 35 to the end of a bolt 37 displaceably mounted in the bore 36. Bolt 37 is axially displaceable by adjusting a tensioning screw 38 for the tensioning of the saw blade 31, which tensioning screw bears against the leg 29 on the side remote from the saw blade 31. The blade is arranged such that the saw blade 31 works with a pulling cut, which signifies that the cutting stroke takes place when the saw blade 31 is moved from left to right in FIG. 1. In order to achieve an arcuate cut here, the saw blade 31 is braced in obliquely by the angle 39 in relation to the guide rods 23. If it is intended for the saw blade to work with a pushing cut, then the angle 39 should be arranged conversely to that shown in FIG. 1. Of course for simple requirements, it may suffice to clamp the saw blade 31 into the saw frame in a position parallel with the guide rods 23.

Figure 3A:
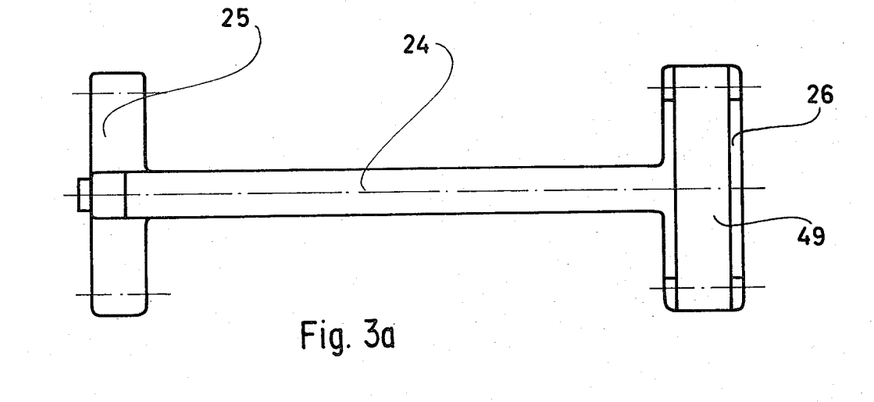
FIG. 3a shows a plan view of the saw frame of the power frame saw of FIG. 1.
Figure 3B:
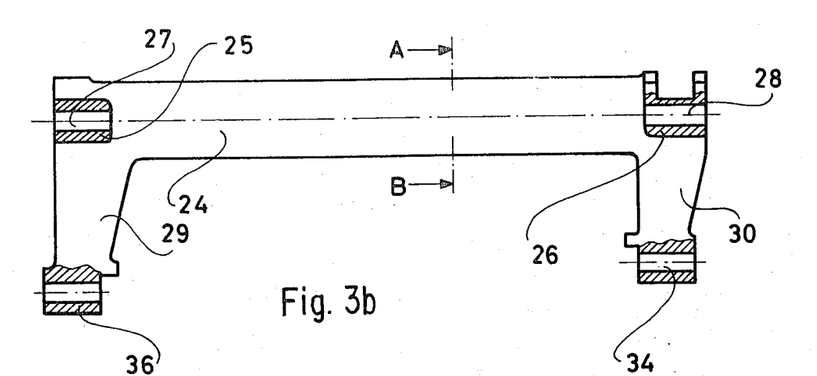
Figure 3C:
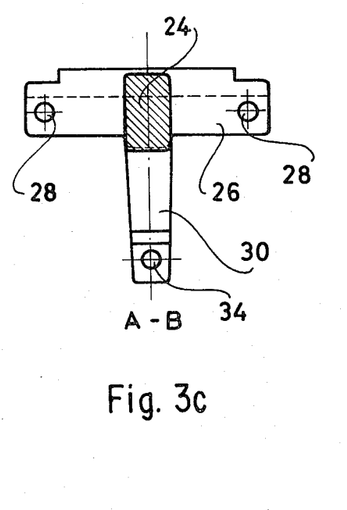

According to FIGS. 1 to 3(a-c), the drive of the saw frame is effected by a crank drive mechanism. This drive mechanism is accommodated in an additional part 40 of the housing 2 and consists of a crank disc 41 which is rotatably mounted about a journal 42 in the housing part 40. The crank disc 41 is driven by a pinion 43 which engages via a gear 44 with gear teeth 41' around the periphery of the crank disc 41. The pinion 43 itself is driven by a power drill 45 which is clamped in between clamping jaws 46, which surround an opening 46' in the housing part 40, by tightening of a clamping screw 47.

The crank disc 41 eccentrically carries a crank pin 48 which engages in a groove 49 which extends in the longitudinal direction along the center of the web 26 above the bores 28.

The guidance of the bores 27 and 28 on the rods 23 and of the crank pin 48 in the groove 49 can be constructed with the use of anti-friction bearings in the direction of minimum possible friction losses. It is also readily possible to replace the guidance of the webs 25 and 26 by means of bores 27 and 28 on the rods 23 by engagement of the webs 25 and 26 with terminal guide faces in corresponding guide grooves of the housing 2, in a manner not illustrated.

The crank drive can alternatively be arranged on the housing 2 in such a way that the crank disc 41 engages via its crank pin 48 with a corresponding transverse groove in the web 25. This arrangement would have the additional advantage that the generation of the cutting force would be even further promoted by the weight of the crank drive and of the power drill 45.

The housing 2 also has a handle at the front consisting of a rod 50 and a knob 51. This handle serves for manually pressing the saw blade 31 against the workpiece via the housing 2, for the generation of the cutting force. Moreover, the housing 2 can have a journal 52 which is eccentrically seated on a bolt 53 rotatable in one of the side members 3 and serves as stop for the lowermost pivotal position of the housing 2, in that it comes to abut with an edge 54 of the machine frame 1.

When the saw blade 31 is tensioned, this leads to different flexures of the back portion 24 of the saw frame. These flexures act upon the guides on the rods 23 to the effect that the axes of the bores 27, 28 tilt in relation to the axis of the guide rods 23. This can be countered by ensuring a specific and correct tensioning of the saw blade 31, or by the bores 27, 28 having so much play in relation to the rods 23 that errors in the correct tensioning of the saw blade 31 have no harmful effect. However such measures are relatively complicated and above all uncertain, especially in view of the fact that power frame saws are frequently operated by untrained personnel.

Figure 4:
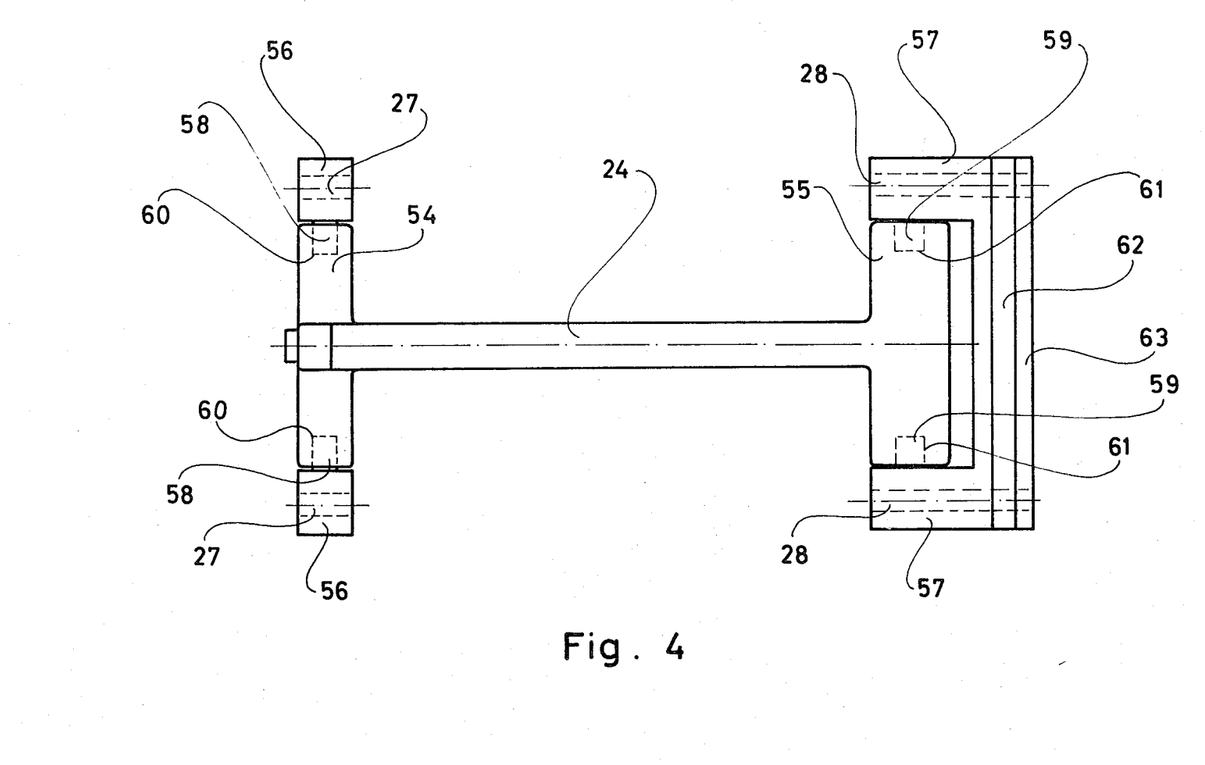
FIG. 4 shows a plan view of another embodiment of a saw frame according to the present invention.

In order to avoid these difficulties, an embodiment of a saw frame such as illustrated in FIG. 4 can be used. The back portion 24 of this saw frame also has webs 54, 55 on its ends. These webs, however, are guided on the rods 23 or in corresponding grooves of the housing 2 through end pieces 56, 57 which engage the webs by means of cylindrical journals 58, 59 in corresponding end bores 60, 61 of the webs 54, 55, and thus are pivotable in relation to these about an axis perpendicular to the working plane of the saw blade and to the stroke direction of the saw frame. In this way different curvatures of the saw frame back 24 in relation to the guides 23 can be compensated.

In order to achieve the same effect for the crank pin 48 in the embodiment shown in FIG. 4, a groove 62 can be arranged in a bridge member 63 which interconnects the end pieces 57. According to FIG. 4, the bridge member 63 is arranged on the rear end of the saw frame back 24. Of course, however, the possibility also exists of arranging the bridge member 63, for example, above the web 55 as a connection between the end pieces 57.

Figure 5:
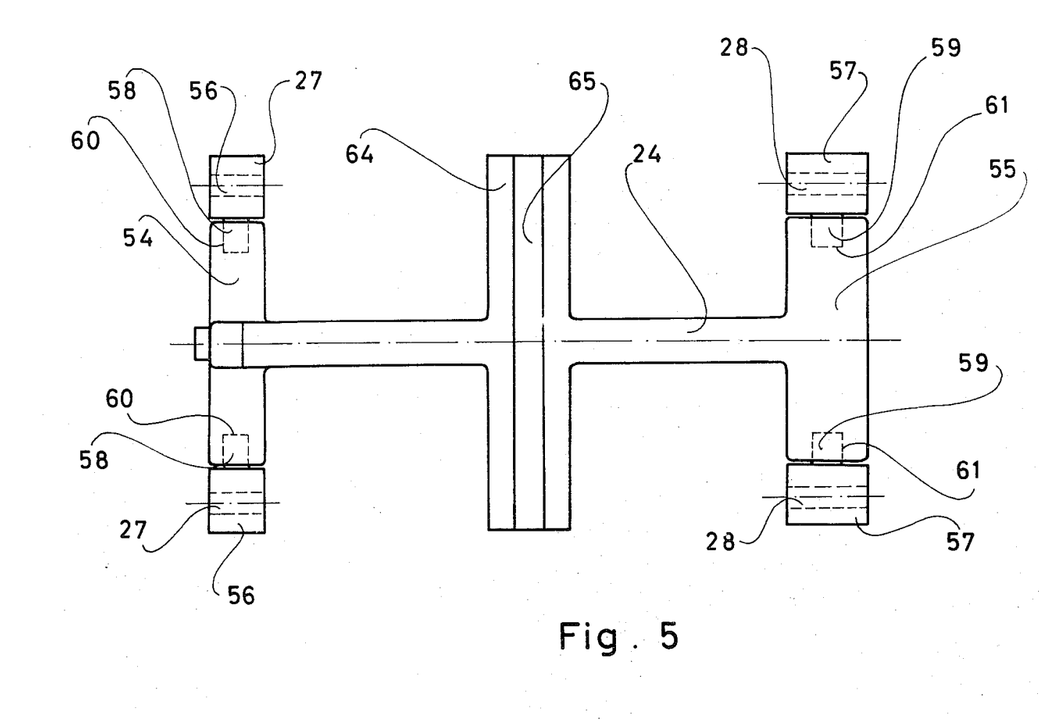
FIG. 5 shows a plan view of a further embodiment of a saw frame according to the present invention.

FIG. 5 shows another embodiment for compensating for flexures in the back portion 24, which is based upon the saw frame embodiment shown in FIG. 4, for which reason the reference numerals used in FIG. 4 are repeated and their significance is not explained again.

In the embodiment shown in FIG. 5, the back portion 24 of the saw frame is equipped in the center of its flexure with a third web section 64 which is movable above the guide rods 23, shown in FIG. 1, and serves exclusively to provide a groove 65 for receiving the crank pin 48 of the crank disc 41. In this arrangement, the pivotal position of the groove 65 is independent of the flexure of the saw frame back 24. It is merely necessary to ensure that there is some space between the crank disc and the upper surface of the web 64 so that the surface of the web 64 will not rub against the crank disc due to the flexure of the back portion 24 of the saw frame.

With the embodiments of the saw frame illustrated in FIGS. 4 and 5, the same crank drive mechanism as shown in FIG. 1 can be utilized. The only modification of the drive mechanism shown in FIG. 1 that would be necessary is for its location to be changed so that the crank pin 48 is arranged to operatively engage the groove 62 or 65, of the embodiment of FIG. 4 or 5, respectively.

Of course, it is also possible, in contrast to the embodiments described above, for the drive of the saw frame to take place due to the fact that a crank rod which acts upon the back portion 24 of the saw blade back is articulated to the crank disc 41. In this case the problem of different curvatures of the back portion 24 of the saw frame can be solved, for example, in that the articulation of the crank rod to the saw frame back is pivotable such as in the form of a ball joint.

Moreover, the invention is not limited to the forms of embodiment as described, which are concerned particularly with the provision of an amateur craftsman's appliance. Rather, the invention can be transferred in the same manner to conventional power frame saws usable in factories, where the machine frame has the form of a pedestal and where, for example, the feed motion of the saw blade is in the direction towards the workpiece and the generation of cutting pressure takes place due to the fact that an appropriate hydraulic apparatus, such as those known in the art, acts on the one hand on the machine frame and on the other on the housing.

It will be understood that the above description of the present invention is susceptible to various modifications, changes and adaptations, and the same are intended to be comprehended within the meaning and range of equivalents of the appended claims.

I claim:

1. In a power frame saw including a bench plate, a machine frame arranged on the bench plate, adjustable clamping means operatively arranged on the bench plate for holding a workpiece during a cutting operation, saw frame for holding a saw blade and including a back portion, housing means pivotably articulated to the machine frame for holding the saw frame in a displaceably mounted arrangement so that the saw frame is capable of being moved in a reciprocating stroke direction, the back portion extending along a longitudinal axis parallel to the reciprocating stroke movement of the saw frame, and drive means arranged within the housing means and having a motor-driven crank drive for driving the saw frame, the improvement comprising: means defining two web sections, each extending transverse to the longitudinal axis of said back portion, said web sections being constituted by two widened sections of said back portion, and guide means displaceably guiding said web sections within said housing means, and wherein said crank drive includes a crank disc rotatably mounted in said housing means above said back portion and operatively associated with said back portion, and said crank disc is positioned substantially within the region of the stroke movement of said saw frame and is mounted for rotation about an axis parallel to the cutting plane of a saw blade held by said saw frame and perpendicular to the direction of the stroke movement.

2. An arrangement as defined in claim 1 wherein said guide means includes means for pivotably mounting the ends of said web sections for pivotable movement about an axis perpendicular to the cutting plane of the saw blade and to the direction of the stroke of said saw frame.

3. An arrangement as defined in claim 2 wherein each of said web sections contain a bore in each of its axial end surfaces, said means for displaceably guiding said web sections include cylindrical journals operatively coupled to said bores in said web sections for holding said web sections and the connection of said bores and said cylindrical journals constitute said means for pivotably mounting the ends of said web sections.

4. An arrangement as defined in claim 2 wherein: said means for pivotably mounting said ends of said web sections includes a bridge member interconnecting the ends of one of said web sections and extending in a direction parallel to the length of said web section; said bridge member has a groove in its top surface, with said groove extending in the longitudinal direction of said bridge member; the axis of rotation of said crank disc lies in the cutting plane of said saw blade; and said crank drive further includes a crank pin mounted for rotation with said disc and operatively engaged within said groove in said bridge member.

5. An arrangement as defined in claim 1 wherein: the axis of rotation of said crank disc lies in the cutting plane of said saw blade; one of said web sections is positioned adjacent to said crank disc, said one web section having a groove in its top surface facing said crank disc and extending along the length of said web section; and said crank drive further includes a crank pin mounted for rotation with said disc and operatively engaged within said groove in said web section.

6. An arrangement as defined in claim 1 further comprising a third web section arranged along the longitudinal axis of said back portion at the center thereof and constituted by a widened portion of said back portion, said third web section extending in a direction parallel to the other said web sections and having a groove in its top surface extending in the longitudinal direction of said third web section, and wherein: the axis of rotation of said crank disc lies in the cutting plane of said saw blade; and said crank drive further includes a crank pin mounted for rotation with said disc and operatively engaged within said groove in said third web section.

7. An arrangement as defined in claim 1 wherein: said means for displaceably guiding said web sections include two spaced mutually parallel rods arranged within said housing means, said rods being positioned in the plane of said web sections and disposed at respectively opposite sides of said back portion of said saw frame; the ends of said web sections have bores therein aligned with said rods and having a cross-section corresponding to the cross-section of said rods; and said rods pass through said bores in said ends of said web sections.

8. An arrangement as defined in claim 1 wherein: said crank disc has gear teeth arranged around its peripheral surface; said housing means has an opening therein whose axis is parallel to the axis of rotation of said crank disc; said housing means includes clamping jaws surrounding said opening and a clamping screw extending between said jaws; said clamping jaws being capable of having a portable drive motor inserted therebetween; and said clamping screw serving to tighten said clamping jaws so as to secure an inserted motor; and said crank drive includes a drive pinion having a threaded shank arranged to be connected with such a motor, said pinion meshing with said gear teeth provided on the periphery of said crank disc for driving said disc by means of such motor.

9. An arrangement as defined in claim 1 wherein said saw blade is oriented obliquely with respect to said means for guiding said saw frame so that during the cutting stroke a feed movement of said saw blade occurs in the direction towards the workpiece.

10. An arrangement as defined in claim 9 wherein: said clamping means includes first and second braces, said first brace being adjustably mounted on said bench plate and said second brace being rigidly secured to said bench plate at the end closer to the pivotable mounting of said housing means; and said saw blade is held by said saw frame so that the cutting movement of said blade is directed towards said first brace.

* * * * *